US009262857B2

(12) United States Patent
Sigal et al.

(10) Patent No.: US 9,262,857 B2
(45) Date of Patent: Feb. 16, 2016

(54) MULTI-LINEAR DYNAMIC HAIR OR CLOTHING MODEL WITH EFFICIENT COLLISION HANDLING

(71) Applicant: Disney Enterprises, Inc., Burbank, CA (US)

(72) Inventors: Leonid Sigal, Pittsburgh, PA (US); Peng Guan, Providence, RI (US); Jessica K. Hodgins, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 342 days.

(21) Appl. No.: 13/743,251

(22) Filed: Jan. 16, 2013

(65) Prior Publication Data

US 2014/0198108 A1    Jul. 17, 2014

(51) Int. Cl.
*G06T 13/40* (2011.01)
*G06T 13/20* (2011.01)

(52) U.S. Cl.
CPC ............... *G06T 13/40* (2013.01); *G06T 13/20* (2013.01); *G06T 2210/16* (2013.01); *G06T 2210/21* (2013.01)

(58) Field of Classification Search
CPC ..... G06T 13/40; G06T 2210/21; G06T 13/20; G06T 2210/16; G06T 19/00; G06T 17/00; G06T 19/20; G06T 13/00
USPC ......................................................... 345/474
See application file for complete search history.

(56) References Cited

U.S. PATENT DOCUMENTS

2010/0169062 A1*   7/2010   Linn et al. ............................ 703/2
2011/0273457 A1    11/2011  De Aguiar et al.
2014/0200496 A1*   7/2014   Hyde et al. ...................... 602/19

OTHER PUBLICATIONS

Hadap et al, Strands and Hair—Modeling, Simulation and Rendering. SIGGRAPH 2007—34 International Confer-ence and Exhibition on Computer Graphics and Interactive Techniques, Aug. 2007, San Diego, United States. ACM, pp. 1-150.*
Zheng, C., James, D. 2012. Energy-based Self-Collision Culling for Arbitrary Mesh Deformations. ACM Trans. Graph. 31 4, Article 98 (Jul. 2012), 12 pages.*
James et al., Precomputing Interactive Dynamic Deformable Scenes, 2003 ACM 0730-0301/03/0700-0879, pp. 879-887.*
Cordier et al., "A Data-driven Approach for Real-Time Clothes Simulation", Proc. 12th Pacific Conference on Computer Graphics and Applications, Seoul, Korea., IEEE Publisher, Oct. 2004, pp. 257-2666.
James et al.,"Precomputing Interactive Dynamic Deformable Scenes", ACM Trans. Graph. 22, Jul. 3, 2003, 879-887.
Oh et al., "Semantics over Geometry: Garmented Body Model Generation for Real-time Simulation", Workshop towards Semantic Virtual Environments (SVE2005), Mar. 1-5, 2005.
Welch, Greg et al., "An Introduction to the Kalman Filter", University of North Carolina at Chapel Hill, Chapel Hill, NC, 1997, 1-16.

* cited by examiner

*Primary Examiner* — Kee M Tung
*Assistant Examiner* — Yuehan Wang
(74) *Attorney, Agent, or Firm* — Dorsey & Whitney LLP

(57) ABSTRACT

Systems and method for modeling hair in real-time with user interactive controls are presented. One embodiment may take the form of a method of hair motion modeling including representing hair with hair guides, each hair guide comprising a plurality of hair points and reducing a dimensionality of the hair guides to achieve a reduced sub-space. Additionally, the method includes generating a data tensor for multiple factors related to the hair guides and decomposing the tensor to create a model characterizing the multiple factors in a multi-linear hair framework. The hair may be hair, such as human hair, animal fur, or clothing fibers.

32 Claims, 12 Drawing Sheets
(10 of 12 Drawing Sheet(s) Filed in Color)

MULTI-LINEAR DYNAMIC HAIR OR CLOTHING MODEL WITH EFFICIENT COLLISION HANDLING

TECHNICAL FIELD

The present application is generally directed to systems and methods that model animated movement of flexible, hanging members. More specifically, the present application is related to systems and methods that model hair, clothing or other dynamic element movement.

BACKGROUND

Hair animation is difficult primarily due to the large volume of hairs considered (a typical human head consists of 100,000 hair strands) and the complex hair motions and interactions. Despite this, there has been enormous success in model acquisition, simulation, and rendering of hair (e.g., Rapunzel's hair in the movie Tangled®). Such high-quality simulations, however, are expensive and generally require off-line processing, in the range of minutes per frame. Real-time applications, such as prototyping and games, have more stringent computational budgets, and hence often rely on less realistic models which are either entirely procedural, topologically constrained, or approximate simulation using low-resolution models.

SUMMARY

Systems and methods for modeling hair, clothing, or other dynamic elements in real-time with user interactive controls are presented. One embodiment may take the form of a method of hair motion modeling including representing hair with hair guides, each hair guide comprising a plurality of hair points and reducing a dimensionality of the hair guides to achieve a reduced sub-space. Additionally, the method includes generating a data tensor for multiple factors related to the hair guides and decomposing the tensor to create a model characterizing the multiple factors in a multi-linear hair framework.

While multiple aspects are disclosed, still other aspects of the present invention will become apparent to those skilled in the art from the following Detailed Description. As will be realized, the aspects are capable of modifications in various aspects, all without departing from the spirit and scope of the aspects. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

1. Introduction

Figure 1:
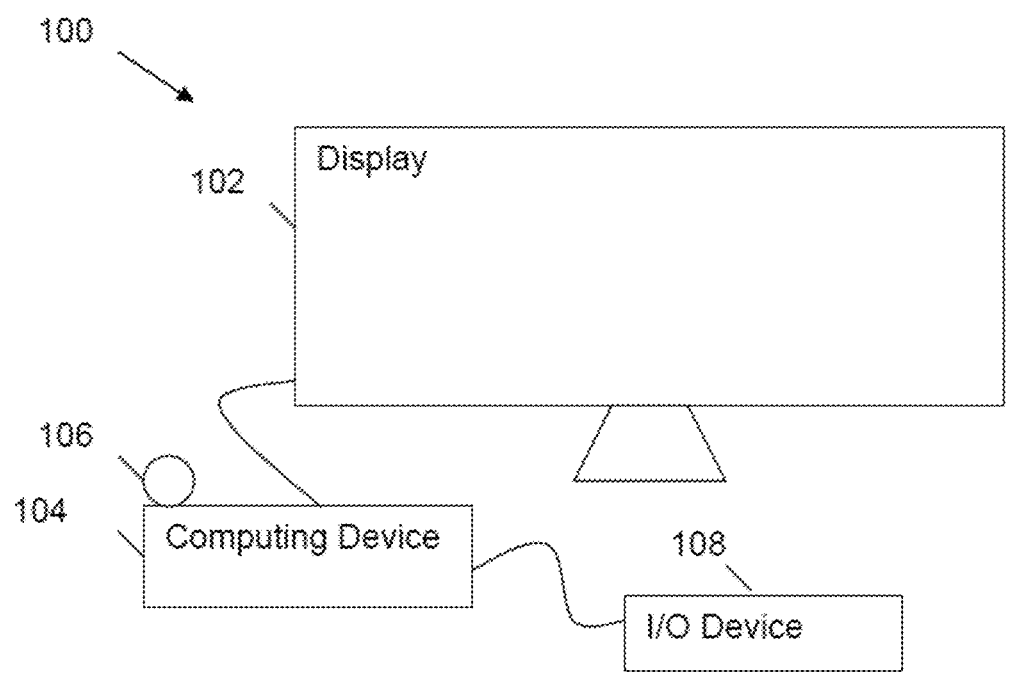
FIG. 1 illustrates an example computing system on which the present techniques may be performed.

Generally, a data-driven, multi-linear reduced-space dynamical model for modeling hair is discussed herein. It is explicitly parameterized by a number of real-valued factors (e.g., hair length, hair softness, wind direction/strength, etc.) that make it easy to adjust the groom and motion of hair interactively at test time. The model is formulated using tensor algebra and illustrates how dynamics can be incorporated within this framework. Further, hair-body collisions are explicitly addressed by an optimization procedure formulated directly in the reduced space and solved using a form of iterative least squares. The formulation goes substantially beyond current reduced-space dynamical models. In fact, the present model is much more robust than prior solutions that they may be considered special cases of the present model.

The data-driven method provides a compact and fast model that is a flexible, low-dimensional representation of dynamic hair motion, but also expressive enough to convey dynamic behaviors seen in high-resolution simulations. The data-driven method builds on the recent success of reduced models for clothing and fluid simulation, but extends them in a number of significant ways. For the present purposes, the focus is primarily on hair animation but it should be appreciated that there are applications other than hair. For example, the present techniques are sufficiently general that they may be used for modeling clothing.

Hair simulations produced by a standard simulation package may be leveraged to build a highly efficient multi-linear model of hair motion as a function of several user-controlled parameters (e.g., hair length, softness and wind direction). To build this model, two basic assumptions are made:

(i) characters in interactive domains typically exist in finite configuration spaces, where, for example, the user has control over the transitions between a finite set of dynamic motions (e.g., as in motion graphs); or has limited dynamic control over the raw character motion (e.g., as with most interactive controllers) where the final configuration of the character is a predefined motion set; and (ii) there exists a continuous manifold space of hair models parameterized by geometric, dynamic, and external factors acting on the hair.

The second assumption is motivated by hair grooming and simulation tools that provide continuous control over these parameters.

The present method receives, as input, multiple sets of hair motions produced by a simulator under various perturbations in the parameters of interest and learns a reduced multi-linear dynamical model approximating the behavior of hair exhibited across all sets. As a consequence, the conditional dynamic base vectors modeling hair evolution may be considered functions of real-valued factors that can be specified by the user at test time (and during simulation). Thus, using a discrete set of simulations, a continuous and intuitive space of dynamic hair models may be constructed. Because the learning method is statistical in nature, the raw results from the multi-linear model may approximately resolve body-hair contacts, which are assumed to dominate hair collisions. This limitation can cause unwanted hair-body penetrations. To explicitly handle this problem in the model, an optimization step is provided that resolves collisions by optimizing the reduced space representation directly. This process is efficient because a small set of hair parameters are optimized, instead of raw hair strand vertex positions.

Unlike prior real-time hair-simulation methods that typically rely on low-resolution models (with a handful of strips or wisps), the present model is considerably more efficient and can deal with up to 4,000 guide hair strands at a small fraction of the computational cost. In contrast to most model reduction approaches, no specific form for the dynamics is assumed. In contrast to data-driven methods, a single linear dynamical model is not learned, but rather a family of models is parameterized by semantic user-specifiable parameters (including external factors like the wind). Also, hair-body collisions are explicitly and efficiently dealt with, which was a limitation of some prior solutions. It should be noted that as used herein the term hair is meant to encompass substantially any type of fiber, such as, but not limited to, human hair, animal fur, clothing fibers, and the like. In these embodiments, each of the flexible elements (hair follicles, fur follicles, clothing fibers or strands) may be attached to a base element, such as a scalp (e.g., for human hair), a body (e.g., animal fur), or a mesh or other base layer (e.g., for cloth). Accordingly, the discussion of any particular hair embodiment is meant as illustrative only. Additionally, the discussion of scalp herein as the base or attachment layer may be expanded to include other types of base elements, such as a body for animal fur.

2. General Modeling

A large body of work exists on hair modeling, simulation, and rendering. Those pertaining to real-time-capable approaches may loosely be organized into two classes of methods: those that model hair as a continuous medium and those that model it as a set of disjoint, possibly interacting, groups. In both cases, the rationale is that the number of strands is too large to model each strand individually. Continuous medium models model hair as a continuum and model complex interactions between strands using fluid dynamics. Such methods, however, are slow and do not capture clustering effects observed in longer hair.

Disjoint models typically model hair using a sparse set of hair guides, hair strips, or wisps. These approaches are particularly good at modeling hair styles with well-defined clusters; however, they are typically computationally expensive (e.g., requiring seconds per frame to compute). Another promising approach uses the hair mesh structure for modeling the hair volume in which topological constraints allow an automatic and unique way to trace the path of individual hair strands through this volume. However, the coarse resolution of the mesh does not allow for fine movement of individual strands.

The instant method exploits the hair guide formulation, but further reduces computational complexity by modeling hair guides in the reduced space. By treating all hair strands as guide curves in the framework, the model learns to incorporate "interpolation" as part of the mapping from the low-dimensional reduced hair space to the full-dimensional hair representation, thereby eliminating the interpolation step.

The present model conceptually builds on reduced-space clothing models. However, the present model is considerably more general as it allows for the real-valued factors that account for the hair groom, style, and external phenomena, to be controlled interactively. These factors modulate the basis of the learned dynamical model. In contrast, the reduced-space clothing model would require a separate model to be learned each time parameters of simulation or groom of the hair changed; producing models for only a discrete set of simulations performed at training. The present model is also able to model external factors, such as wind, which would not be possible with the reduced-space clothing models. In addition, the present method explicitly deals with collision detection and resolution in the reduced space. The prior reduced-space clothing models only approximately maintain depth ordering and require a custom rendering pipeline to resolve problematic cases.

The present formulation further builds on the formalism of multilinear subspace learning from tensor data. In the past, multi-linear models have been used for face recognition and transfer, human motion modeling and image-based texture mapping. Unlike prior methods that use multi-linear models as a way to build generative representations of spatial or spatio-temporal data, conditional models of hair dynamics are built using multi-linear models. Finally, because style (or groom) is used as one of the factors, the space of geometric variations in hair groom can also be modeled. This addition allows users to create styles on-line without explicit grooming by an animator.

3. Overview

The present techniques generally may be targeted to low-cost, real-time, high-fidelity simulations of hair (or clothing, fur) and the various contexts in which such simulations may be useful and/or advantageous. For example, the hair simulation may be implemented as part of a video game or a gaming system, real-time interactive systems for guests at an amusement park, exploration of characters for animation where hair length and style may be manipulated to give preview of character, or as an intermediate step during an animation process. It should be appreciated that the foregoing list is not exhaustive and various other uses and applications can be imagined and/or may later become apparent. The cost in terms of computational requirements, as well as animation (time and energy) is both significantly lower than conventional hair modeling techniques. The approach is also applicable to modeling other physical phenomena such as clothing or fur.

FIG. 1 illustrates an example computing system 100 on which the present methods may be performed. Generally, the computing system 100 includes a display 102 to which a computing device 104 is communicatively coupled. The display 102 may take any suitable form and in some embodiments, may take the form of a cathode ray tube display, a liquid crystal display, a plasma display, a light-emitting diode display, and so forth. The computing device 104 may also take any suitable form including, but not limited to, a desktop computer, a notebook computer, a tablet computer, a video game console, or a plurality of such devices or other computing devices. Additionally, the computing device 104 may be configured to communicate via a network with other computing devices. In some embodiments, one or more parts of the method may be performed by a remote computer. For example, the computing device 104 may communicate via the Internet or other network with a server computer that may support the execution of the method, such as by providing data sets to the computing device and/or by providing other information.

The computing device 104 may be in communication with one or more peripheral devices, such as a camera 106 and other I/O devices 108, such as a keyboard, mouse, trackpad, and so forth. The peripheral devices may provide input to the computing device 104 that may be utilized to configure parameters related to the hair simulation. For example, a keyboard or mouse may be used to adjust one or more of a hair length, hair density, hair style (e.g., curly, wavey, straight, etc.), wind direction, wind speed, speed of movement, and so forth. Additionally, or alternatively, the camera 106 may obtain images that may be utilized in the hair modeling. For example, in some embodiments, the camera 106 may capture an image of a person on which hair may be modeled. Alternatively, the camera 106 may capture a color, style, length and so forth of hair that is to be modeled. The camera 106, which may be a depth camera, can also capture motion of the subject on which the hair may be animated for an augmented reality application.

Figure 2:
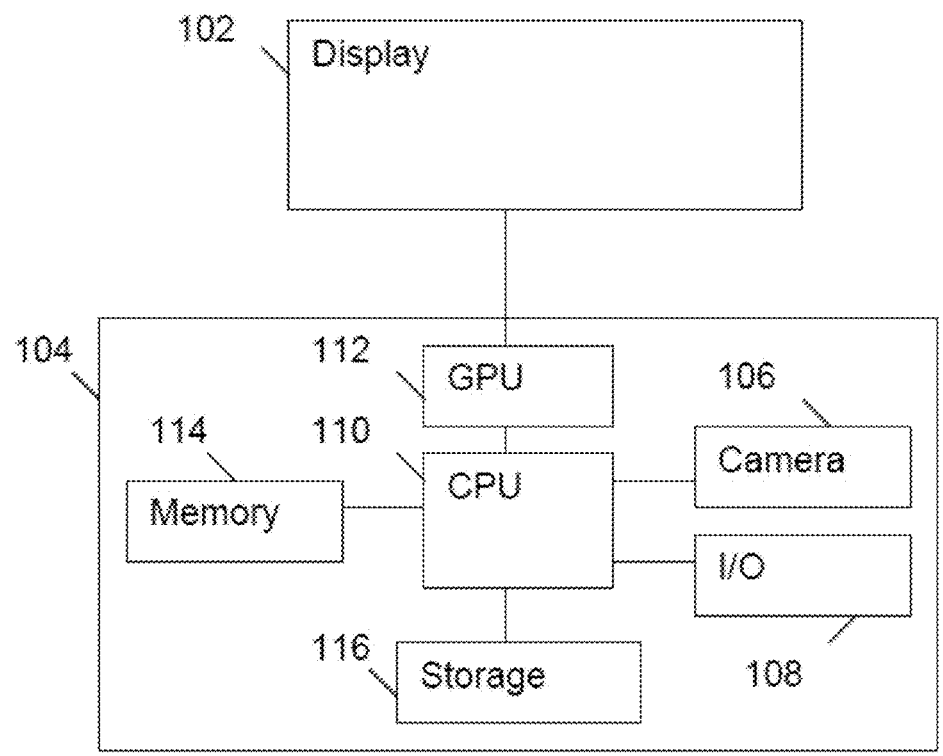
FIG. 2 is a block diagram of the computing system of FIG. 1.

FIG. 2 is a block diagram illustrating the computer system 100. The block diagram shows the computer device 104 as including a central processing unit (CPU) 110, a graphics processing unit (GPU) 112, a memory 114, and a storage device 116. The CPU 110 may be coupled to each of the various components either directly or via a bridge, port or other such structure depending on the particular architecture employed. In some embodiments, the present techniques may be performed solely by the CPU 110. In other embodiments, portions of the present techniques may be performed by the GPU 112. The memory 114 may take the form of random access memory (RAM), dynamic RAM (DRAM), synchronous DRAM, or other suitable form. The storage 116 may also take any suitable form, such as a hard disk drive, a solid-state or semiconductor drive, and so forth. The storage 116 may store operating instructions executable by the CPU 110 to effectuate the present techniques. Additionally, the storage 116 may store parameters and/or data sets related to the performance of the present techniques.

Figure 3:
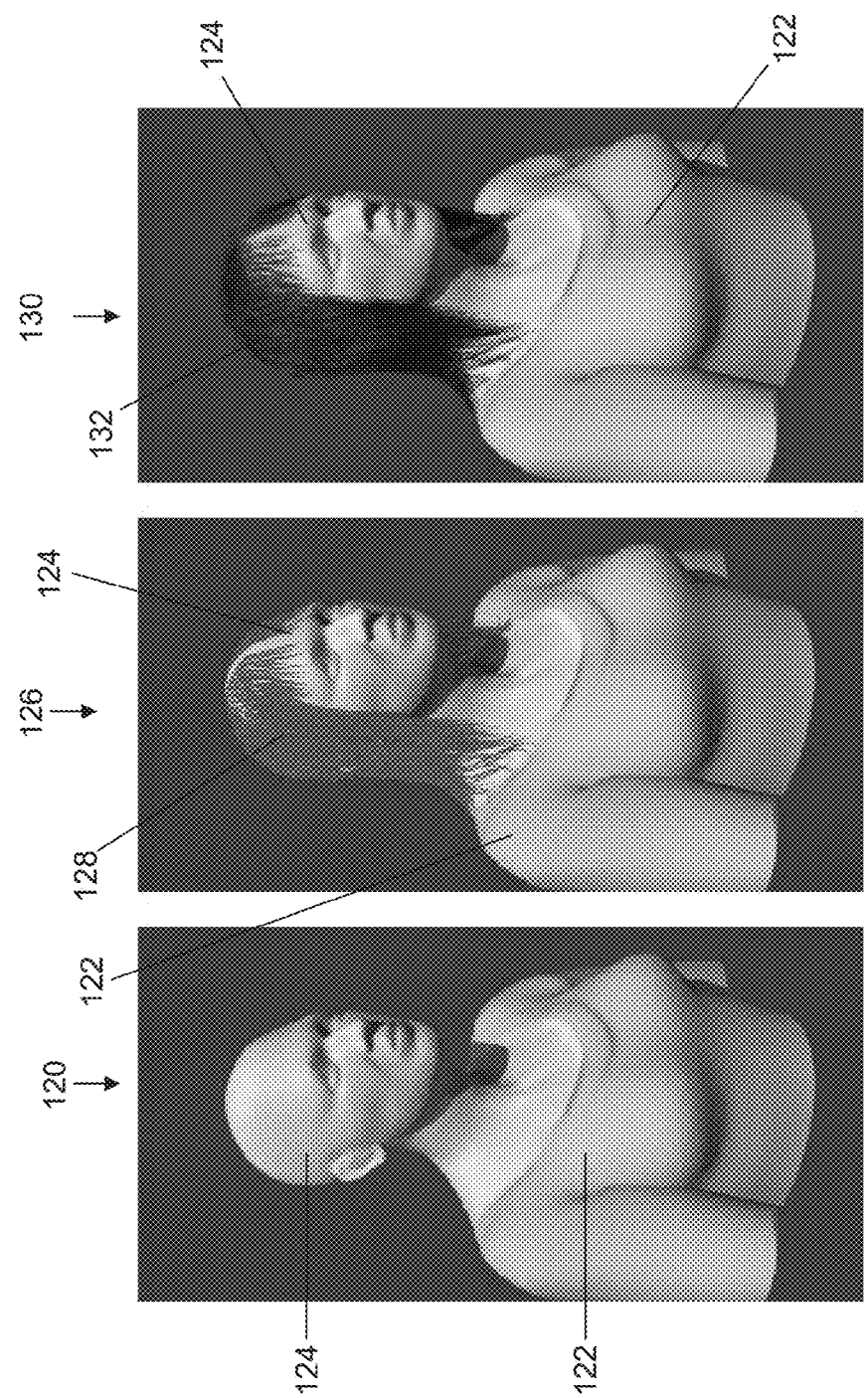
FIG. 3 illustrates hair and geometry for (left) bust and the scalp to which hair guides are attached; (middle) bust with 900 hair guides attached; (right) rendering using interpolated hairs.

In accordance with certain aspects, a data-driven approach to learn a multi-linear dynamical hair model from physically simulated hair sequences is provided. To reduce complexity, hair guides to represent bundles of hairs are used. FIG. 3 is an illustration of hair and geometry with a left image 120 showing a bust 122 and scalp 124 to which hair guides are attached, a middle image 126 showing the bust 122 with 900 hair guides 128 attached to the scalp 124, and right image 130 showing the rendering using interpolated hairs 132. Both the learning and the subsequent collision handling are performed in the low-dimensional (50-100) PCA sub-space representation of hair. Generally, the proposed method consists of:

A Multi-linear Hair Framework: A tensor model is built which represents hair as a product of linear factors, including hair length, hair softness, and head pose. The hair at the current frame may be predicted by conditioning the model on these factors.

Dynamics: A second order conditional dynamical model is implemented such that the current hair configuration is written as a function of the past hair configurations and the current head motion within the above mentioned multi-linear framework.

Collision Handling: A cost function is designed to minimize the hair-body penetration while keeping the natural hair dynamics and hair roots affixed to the scalp. The collision handling can be formulated and solved as an extremely efficient iterative least squares problem.

The model has been tested on a number of motion sequences and is capable of generating different realistic hair styles and generalizing to unseen motions.

4. Representation

An average adult has more than 100,000 hair fibers on the head. As such it would be expensive to model every single hair. Instead, a physically based hair simulation software may be used to simulate a number of hair guides, each guide being the proxy for a bundle of hair strands. For example, XGen by Walt Disney Animation Studios or other hair modeling software applications may be used. The hairs may be simulated on the head of the virtual character, animated and skinned using a set of 35 motion capture sequences. Fewer or more motion capture sequence (or animations of the character) may be used depending on the complexity of the desired hair behavior. A suitable standard approach may be employed to interpolate between hair guides to obtain a full set of hair strands.

Figure 4:
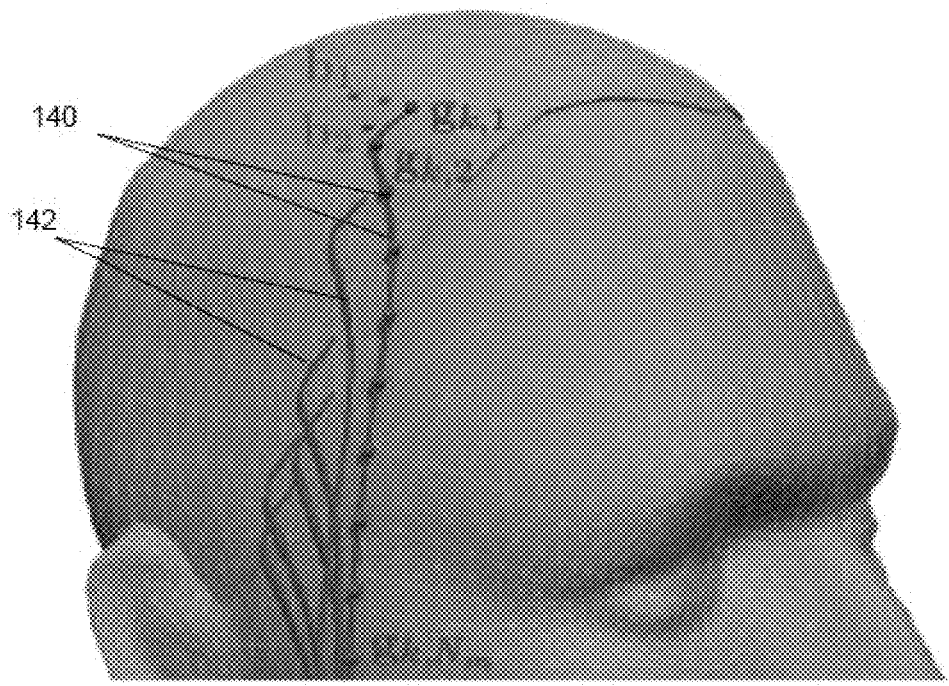
FIG. 4 illustrates hair and body parametrization using control points on a sparse set of guides and body using vertices making up the triangular mesh of bust.

FIG. 4 illustrates hair and body parametrization. The hair is represented using control points 140 on a sparse set of guides 142 and body is represented using the triangular mesh. Alternative representations may also be possible. For example, body may be represented using a deformation gradient field.

Hair: $N_g$ guides per-frame may be used and every guide $g_k(1 \leq k \leq N_g)$ is a curve represented by $N_m=15$ points in 3D (see FIG. 4). Curves with higher or lower vertex count may also be used instead, depending on the complexity of the desired hair styles. Three different datasets may be generated with $N_g$ being 198, 962, and 3980 respectively. They allow exploration as to how the model behaves given different numbers of hair guides. Let $g_{k,1}, g_{k,2}, \ldots, g_{k,N_m} \in \mathbb{R}^3$ be the points on guide k and concatenate the x, y, z coordinates of points from the guide to obtain $$g_k = [g_{k,1}, g_{k,2}, \ldots, g_{k,N_m}] = \begin{bmatrix} g_{k,1,x}, g_{k,1,y}, g_{k,1,z}, \cdots, \\ g_{k,N_m x}, g_{k,N_m y}, g_{k,N_m z} \end{bmatrix} \in \mathbb{R}^{3N_m}.$$

All the guides are put together and tall vector $h=[g_1, g_2, \ldots, g_{N_g}]^T \in \mathbb{R}^{N_h}$ is used to represent one frame of hairs, where $N_h=3N_m N_g$.

Body: Similarly the body may be represented using a set of vertices of the triangular mesh (see FIG. 4). For the purposes of the present model, only consider the head and the shoulders (the bust) of the mesh with which hair can potentially come in contact (see FIG. 3 (left image 120)). However, for longer hair styles larger fraction of the overall body maybe considered (e.g., entire upper body, or even the full body). Assuming that there are $N_n$ vertices in the bust and that each vertex is represented as $b_i=[b_{i,x}, b_{i,y}, b_{i,z}] \in \mathbb{R}^3$, at a single frame the body is represented using $b=[b_1, b_2, \ldots, b_{N_n}]^T \in \mathbb{R}^{N_b}$ where $N_b=3N_n$.

4.1 Dimensionality Reduction

Given the correlation among the hair guides (and body vertices) and the constrained topology of hair points, the underlying number of degrees of freedom (DOF) is much less than $N_h$ (or $N_b$ in the case of the body). Hence, a dimension reduction scheme may be employed, such as Locality Preserving Projections (LPP) or Principal Component Analysis (PCA), to reduce the dimensionality of the two representations. Generally, the dimension reduction scheme that provides better speed, compressibility, and recovery of hair dynamics may be preferred. Most of the variation in the geometric hair appearance may be captured using a much lower dimensional space (typically between 50 to 100, but this will depend on the application and hair styles/motions being modeled). In other aspects more or fewer dimensions may be used. As the configuration of the bust is much more constrained, fewer dimensions may be used. For example, fewer than 50 dimensions may be used, and in some aspects, 10 dimensions may be used to represent the bust.

4.2 Dimensionality Reduction in Canonical Space

The choice of the space in which the hair and bust are represented is also a practical issue. Representation in the original world space is possible, but hinders generalization. Therefore, the motion is modeled in a canonical space to improve generalization.

Assume that the hair motion is only determined by the motion of the bust and do not consider hair-hand interaction in this work. To normalize hairs and bust at frame t, transform all the hair points and the bust vertices into a canonical space by: (1) subtracting the average position of the bust vertices, $$\tilde{P}_t = \frac{1}{N_n} \sum_{i=1}^{N_n} b_{i,t} \in \mathbb{R}^3$$

and (2) rotating the bust (and hairs) around the Y-axis, $r_t \in \mathbb{R}^1$ such that the head is facing towards the positive Z-axis. In this work, the negative Y-axis is the gravity direction. PCA may be applied on the normalized data.

As a result, the hair at frame t, $h_t \in \mathbb{R}^{N_h}$ can be written as:

$$h_t = R_y(r_t)[\Lambda^h y_t + \mu^h] + p_t \quad (1)$$

where $R_y(r_t)$ is a 3×3 rotation matrix around the Y-axis that rotates the hairs from a canonical space back to world space, $\Lambda^h \in \mathbb{R}^{N_h \times d_h}$ are the eigenvectors learned by the hair PCA, $d_h$ is the dimension chosen to represent the hair, $\mu_h \mu^h$ is the mean normalized hairs of the training data, and $y_t$ is a vector of hair PCA coefficients for frame t.

The bust vertices are represented in a similar way:

$$b_t = R_y(r_t)[\Lambda^b x_t + \mu^b] + p_t \quad (2)$$

where $\Lambda^b \in \mathbb{R}^{N_b \times d_b}$ are the eigenvectors learned by the bust PCA, $d_b$ is the dimension chosen to represent the bust, $\mu_b \mu^b$ is the mean normalized bust of the training data, and $x_t$ $x_t$ is a vector of bust PCA coefficients for frame t.

5. Multi-linear Hair Framework

The appearance of hair is a composite effect of many factors, such as hair length, hair softness, head pose, and motion. Other possible factors include styling products (e.g., jells) or environmental factors (e.g., humidity). In some aspects, the hair model is explicitly parameterized using these real-valued factors. By changing the values of any of these factors, hair may be synthesized with different appearance, configuration, and motion. To simplify the formulation, a generative multi-linear model for hair appearance is introduced in a given frame and how that model can be extended to incorporate dynamics for synthesis is illustrated.

Multi-linear algebra provides a mathematical framework to factorize hair appearance. Alternative embodiments may utilize non-linear factored models instead. The synthesized hair exemplars, parameterized by reduced representation, are built into a data tensor D that is later decomposed in order to separate and represent each constituent factor. Tensor operations may be performed in any suitable manner. In one aspect, Matlab Tensor Toolbox may be used to perform tensor operations. Hair data is built into a N>2 tensor or N-way array D, and N-mode singular value decomposition (N-SVD) orthogonalizes N spaces and decomposes the tensor as the mode—N product:

$$\mathcal{D} = \mathcal{Z} \times_1 U_1 \times_2 U_2 \ldots \times_i U_i \ldots \times_N U_N. \quad (3)$$

The core tensor Z governs the interaction between the mode matrices $U_i \ldots U_N$, and each mode matrix $U_i$ is obtained by mode—i flattening of D.

The formulation is discussed in terms of a simple model with two factors, but a variety of other models of this form is discussed below the results section (or can be developed in other embodiments). The training dataset is prepared such that there are $N_l=2$ different hair lengths (short and long), $N_s=2$ different hair softnesses (soft and stiff). Note that all hair models in the dataset are in correspondence, i.e., contain the same number of hair strands, the same number of points per strand and the same scalp attachment points. Each hair length and softness combination corresponds to approximately $N_f=12000$ frames of different head poses from 35 training sequences (animated using motion capture data). The total size of the training set is $N_l \times N_s \times N_f$ frames.

The representation of one hair, $y \in \mathbb{R}^{d_h}$, is discussed using a multi-linear generative model. For the simple case of the two factors above (length and softness), the hair data tensor D is a $d_h \times N_l \times N_s \times N_f$ array, which is decomposed to:

$$\mathcal{D} = \mathcal{Z} \times_1 U_{hair} \times_2 U_{length} \ldots \times_3 U_{softness} \times_4 U_{config} \quad (4)$$

Figure 5:
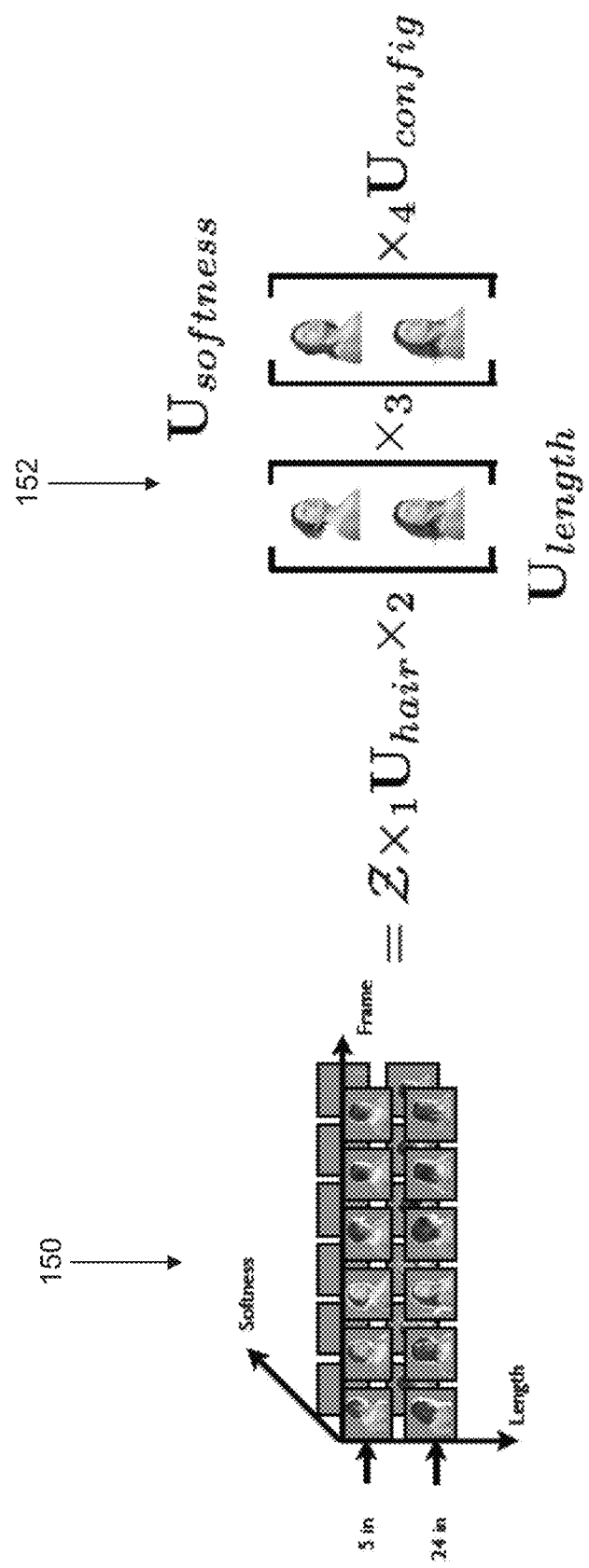
FIG. 5 illustrates the multi-linear hair model with a representation of the hair tensor D, on the left, as a core tensor and mode matrices, on the right.

$\mathcal{Z} \in \mathbb{R}^{d_h \times N_l \times N_s \times N^*_f}$, with $N^*_f = \min(N_f, d_h \cdot N_l \cdot N_s) = d_h \cdot N_l \cdot N_s$ in this case, is core tensor and $U_{hair}$ is hair mode matrix which will be projected out. FIG. 5 illustrates the multi-linear hair model with the representation of the hair tensor D 150 as a core tensor and mode matrices 152. The $N_l \times N_l$, $N_l \times N_l$ mode matrix $U_{length}$ spans the space of hair length parameters, each row of which corresponds to a different hair length in the dataset. Similarly, the $N_s \times N_s$, $N_s \times N_s$ mode matrix $U_{softness}$ spans the space of hair softness parameters, each row of which corresponds to a different hair softness in the dataset. $U_{config}$ spans the space of hair configurations that encode variations in hair appearance as the body moves. This model characterizes how hair length, softness and configuration interact and multiplicatively modulate the appearance of hair.

In general, synthesis of novel hair length and softness is the objective. This may be achieved by interpolating between the rows in $U_{length}$ ($U_{softness}$). This corresponds to convex combination of bases, using barycentric coordinates, and can be extended to dataset with $N_l > 2N_l > 2$ and/or $N_s > 2N_s > 2$. Let $v_{length} \in \mathbb{R}^{N_l}$ ($v_{softness} \in \mathbb{R}^{N_s}$) be a vector of coefficients that interpolates between the rows of $U_{length}$ ($U_{softness}$). Note that for the simple dataset above, where $N_l = 2$, $v_{length} = U_{length}^T \cdot [\alpha, (1-\alpha)]^T$, where $\alpha \in (0, 1)$.

Hair coefficients, y, can be generated by specifying all the constituent factors (length, softness, and configuration):

$$y = \mathcal{Z} \times_1 U_{hair} \times_2 v_{length} \times_3 v_{softness} \times_4 v_{config}. \quad (5)$$

Eq. 5 allows generation of hair with different appearance using only a few matrix multiplications. To synthesize hairs with fixed style (length and softness), pre-compute $\mathcal{M} \in \mathbb{R}^{d_h \times (N_l \cdot N_s \cdot N^*_f)}$ $$\mathcal{M} = \mathcal{Z} \times_1 U_{hair} \times_2 v_{length} \times_3 v_{softness}, \quad (6)$$

which corresponds to a linear space that spans the hair PCA coefficients. Only one matrix multiplication is performed to obtain $y = \mathcal{M} \cdot v_{config}$ where $v_{config}$ is the set of coefficients that encode hair configuration. However, for a given frame, no explicit knowledge of $v_{config}$ a priori is provided. Instead solving for $v_{config}$ by conditioning the model on the bust pose and previous hair configurations is performed, as discussed below. Conditioning on previous hair configurations allows the modeling dynamics.

6. Dynamics

The simple formulation above is unable to model dynamics and there is no intuitive way to condition the model to obtain $v_{config}$ for a given frame. To address the first limitation, a generative model over a short (3-frame) temporal window of hair and bust configurations is built. This allows modeling the relationship between the (presumably unknown) hair configuration at the current frame and the (presumably known) body as well as (presumably known) hair configurations at the past frames. To address the second limitation, this model can then be conditioned to predict/simulate the configuration of the hair at the current frame. More specifically, a 2-th order dynamical model on the hair is assumed (consistent with a 2-nd order ODE governing the true dynamics and empirical observations). Also a control signal $x_t$, in the form of a bust at time t, that governs the motion of the hair and (later) collision detection is assumed. In certain applications it may be desirable to utilize a higher or lower dimensional dynamical model, however, for a large class of applications 2-nd order model should perform adequately and optimally.

Dynamic Multi-linear Hair Model:

As a result, a multi-linear model is learned as in Section 5, but with augmented vectors $w_t = [x_t; y_{t-2}; y_{t-1}; Z_{t,t-2}; Z_{t-1,t-2}; y_t] \in \mathbb{R}^{d_a}$ where $d_a = d_b + 3d_h + 10$, and $z_{t,j} \in \mathbb{R}^5$ encodes the relative global bust translation and rotation at frame t with respect to frame j:

$$z_{t,j} = \begin{bmatrix} R_y(-r_j)(p_t - p_j) \\ \sin(r_t - r_j) \\ \cos(r_t - r_j) \end{bmatrix}. \quad (7)$$

Note that $z_{t,t-2}$ and $z_{t-1,t-2}$ is added because the body and hair are normalized into a canonical space, so the incremental global motion is lost and needs to be added back (in the form of these auxiliary variables). The resulting hair tensor is $\mathcal{D} \in \mathbb{R}^{d_a \times N_l \times N_s \times N^*_f}$. where $N^*_f = d_a \cdot N_l \cdot N_s$. Additional experimentation was performed with a complete generative model over the 3-frame temporal window (by adding $x_{t-1}$ and $x_{t-2}$ to the augmented vector $w_t$) as well as with longer temporal windows but longer windows did not result in better performance, often led to over-fitting, and resulted in higher dimensional (more expensive) model inference. We note that such behaviors were only observed in the target application, and in other embodiments larger than 3-frame or smaller than 3-frame window may be used or preferred.

Simulation as Inference:

For every time instant, $y_t$ is estimated to animate the hair. To do so, treat $y_t$ as missing data and infer it using the generative multi-linear model above operating on the augmented representation $w_t$. This is achieved by conditioning on the part of the vector $wo_t$ that is observed at a given time instance. For example, for the first and second framelet $w_t^o = [x_t] \in \mathbb{R}^{d_b}$, and for all subsequent frames, $w_t^o = [x_t; y_{t-2}; y_{t-1}; z_{t,t-2}; z_{t-1,t-2}] \in \mathbb{R}^{d_a - d_h}$. For every time instance, condition the model on the observed part, $w_t^o$, and infer/predict the unobserved part, $y_t \in \mathbb{R}^{d_h}$ (i.e., hairs for the current frame). For a given hair style (fixed hair length and softness), the pre-computed matrix $\mathcal{M} = [\mathcal{M}^o; \mathcal{M}^u; \mathcal{M}^y]$ computed using Equation 6, can be decomposed into three parts, consisting of bases for reconstruction of observed, $\mathcal{M}^o$, and unobserved (missing), $\mathcal{M}^u$, variables, as well as $y_t$ itself. Note that for the general case where t≥3, $\mathcal{M}^u$ degenerates to an empty matrix, because there is no unobserved data except for $y_t y_t$.

From Section 5, $w_t = [w_t^o; w_t^u; y_t] = M v_{config,t}$. Hence, solve for the linearly optimal $v_{config,t}$ for the current frame t by doing a linear sub-space solve, $v_{config,t} = (\mathcal{M}^o)^\dagger \cdot w_t^o$, where t † is the pseudo inverse. Then reconstruct $y_t$ from $v_{config,t}$, resulting in a very efficient and compact iterative simulation equation, $$y_t = \mathcal{M}^y \cdot (\mathcal{M}^o)^\dagger \cdot w_t^o \quad (8)$$

Note, that to change the hair style anywhere (or continuously) within a sequence, simply re-compute $\mathcal{M}^y \cdot (M^o)^\dagger$ (at every frame). For a general case, $$y_t = \mathcal{M}^y \cdot (\mathcal{M}^o)^\dagger \cdot [x_t; y_{t-2}; y_{t-1}; z_{t,t-2}; z_{t-1,t-2}] \quad (9)$$

For a given set of factors, the model can be interpreted as a second order conditional linear dynamical system, i.e., $$y_t = Ax_t + B_1 y_{t-2} + B_2 y_{t-1} + C_1 z_{t,t-2} + C_2 z_{t-1,t-2}, \quad (10)$$

where $$\mathcal{M}^y \cdot (M^o)^\dagger = [A \quad B_1 \quad B_2 \quad C_1 \quad C_2] \quad (11)$$

Therefore, the prior proposed model is a special case of the present more general formulation. The model spans the space of conditional dynamical models.

6.1 Stability of Dynamics

Additionally, it is possible to measure the stability of the learned model by looking at the largest eigenvalue, $\lambda_{max}$, of linear dynamics matrix of the dynamical system, namely:

$$\begin{bmatrix} B_1 & B_2 \\ I_{d_h \times d_h} & O_{d_h \times d_h} \end{bmatrix} \quad (12)$$

Figure 6:
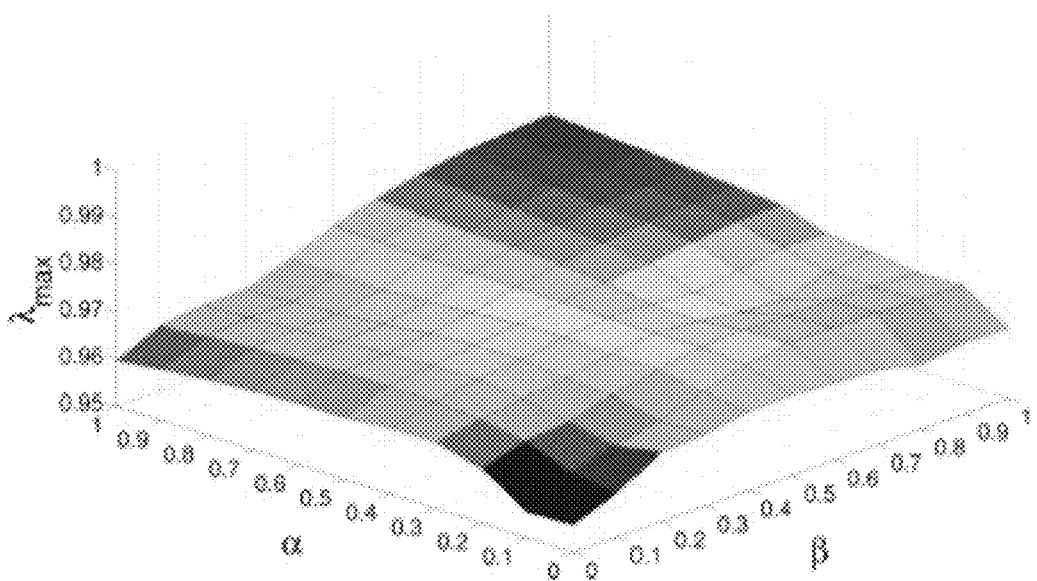
FIG. 6 illustrates the stability of dynamics through sampling. Specifically, $\alpha$ and $\beta$ were sampled using a 0.1 interval, and interpolating the $\lambda$'s in between, where $\alpha=1$ were the long hairs and, $\beta=1$ were the softest hairs.

B1 and B2 (LEON: these should match equations) are both functions of the factors, $V_{length}$ and $V_{softness}$, in the multi-linear model. Hence, to prove stability, ensure that the largest eigenvalue $\lambda_{max}$ is ≤1 for any value of factors in the model. Formally, show that:

$$\lambda_{max} = \arg \max_{\alpha \in [0,1], \beta \in [0,1]} \lambda_{max}(\alpha, \beta) \leq 1 \quad (13)$$

where α and β are parameters interpolating between the bases of $U_{length}$ and $U_{softness}$ respectively. A similar argument would be made for models with more, or different, factors. Taking arg max is difficult in practice, because it involves taking eigenvalues of relatively complex expressions including a product of a pseudo inverse. Instead of a closed form solution, an approximation obtained by evaluating arg max using a set of discrete samples (by uniformly and finely sampling α and β in the range of 0 to 1) is used and assuming eigenvalues are locally smooth as a function of α and β. The plot of $\lambda_{max}$ as a function of α and β is shown in FIG. 6. Specifically, FIG. 6 illustrates the stability of dynamics including sampling α and β using 0.1 interval, and interpolating the λ's in between, with α=1 being the long hairs and, β=1 being the softest hairs. The largest λ is 0.9792 while the smallest is 0.9558. At no point $\lambda_{max}$ is >1, leading to an overall stable model.

7. Collision Handling

The reconstructed hairs $h_t$, which are a function of predicted hair coefficients $y_t$, may cause penetration between the hairs and the bust. Generally, hair-hair collision are ignored as they are not visible for most hair styles. A simple and efficient method to resolve collisions is proposed. This method is based on minimizing hair-bust penetration while keeping the predicted hair coefficients unchanged as much as possible. Collision handling is done in the normalized coordinates and the optimization is performed on the reduced PCA subspace. The hairs are then transformed back to the original space.

The measurement of collision is based on a simple approximation of the signed distance to the body mesh. For a hair point $h_i(y)$, its nearest neighbor vertex is found on the bust $b_j$. Then the dot product of $b_j$'s surface normal vector and the offset vector $h_i(y)-b_j$ locally approximates the signed distance to the body mesh for $h_i(y)$.

$$p_C(y) = \sum_{(i,j) \in C} \rho\left(n_{b_j}^T \cdot (h_i(y) - b_j)\right) \quad (14)$$

where C is a set of correspondences between hair guide point hi $h_i$ and its closest bust vertex $b_j$, $$\rho(x) = \begin{cases} 0 & x \geq 0 \\ x^2/(\sigma^2 + x^2) & x < 0 \end{cases} \quad (15)$$

is a robust error function which only penalizes negative signed distance (i.e., hair points that collide), $n_{b_j}$ (LEON: Equations should match above) is the normal for bust vertex $b_j$. The temporal subscript is dropped for clarity because collision detection is resolved independently at each frame.

Method A: A straightforward way to remove collisions is to minimize the energy function $$E_c(y) = \pi_1 p_c(y) + \pi_2 d_c(y) + \pi_3 s_c(y) \quad (16)$$

with respect to the hair PCA coefficients y. The first term, defined in Eq. (14), minimizes penetration. The second term, $$d_c(y) = \|y - y_0\|^2 \quad (17)$$

helps ensure that the resulting hair coefficients are close to the prediction from the model (to preserve dynamics); where $y_0$ are the predicted hair PCA coefficients from the multi-linear dynamical model. The third term, $$s_C(y) = \sum_{k \in [1, N_g]} \|g_{k,1}(y) - \tilde{g}_{k,1}\|^2 \quad (18)$$

helps ensure that the hair roots are at correct positions on the scalp; where $\tilde{g}_{k,1}$ is the true hair root position on the scalp for the k-th guide, and $g_{k,1}(y)$ is the model position. $\pi_1$, $\pi_2$ and $\pi_3$ are the relative weights for each of the terms.

Assuming, $y^*_t = \arg\min E_c(y_t)$ are the optimized hair coefficients for frame t, the final hair guides in the world space are obtained by:

$$h_t^* = R_y(r_t)[\Lambda^h y_t^* + \mu^h] + p_t \quad (19)$$

For efficiency, the nearest neighbor correspondences C are pre-computed based on the model predicted hairs before running Levenberg-Marquardt optimization on Eq. (16), and are kept fixed throughout. Other optimizations methods can be used in alternative embodiments.

Method β: Method A is fast but still involves a relatively expensive gradient optimization. An approximation scheme is proposed which is around 50× faster than Method A while producing very similar collision handling results. The key idea is to reformulate the optimization in Method A in terms of a series of linear least squares (LLS) problems that can be solved extremely efficiently in closed form. $d_c(y)$ and $s_c(y)$ in Eq. (16) already have a convenient quadratic form and require no special treatment. The first term in Eq. (16), $p_c(y)$, however, is an asymmetric error function and requires approximation. Approximate $p_c(y)$ by taking into account only the set of hair points that currently penetrate P:

$$p_C(y) \approx \sum_{(i,j) \in C \cap i \in P} \left\|n_{b_j}^T \cdot (h_i(y) - b_j)\right\|^2 \quad (20)$$

With this approximation, every term in Eq. (16) takes quadratic form and all the variables are linear functions of unknowns y, resulting in a standard LLS problem. Because the approximation in Eq. (20) is instantaneous and only deals with the current penetrating guide vertices, new penetrations may be introduced in the solution. To address this, iteratively solve the optimization in Eq. (16), and for each iteration, re-compute Eq. (20), including the current set of penetrating points. Five iterations have been observed to be sufficient in practice.

Sub-sampling: Method B allows real-time hair collision handling when the number of hair guides $N_g$ is moderate. In one dataset, where $N_g$=3980, collision of $N_m \cdot N_g$=59700 hair guide vertices are solved for. In this scenario, the computational bottleneck of Method B becomes computing the nearest neighbor correspondences C. To address this, sub-sample the hair guide strands and only perform collision handling on selected guides. The intuition is that because of modeling hair in the PCA sub-space, the hair guides are correlated and guides within some neighborhood will generally move together. Assuming this is the case, resolving collisions for some hair guides will implicitly resolve collisions for nearby hair guides. To achieve this goal, Eq. (20) is re-written once again, resulting in the final form for $p_c(y)$:

$$pc(y) \approx \tau \sum_{(i,j) \in ^c \cap i \in p \cap i \in s_\tau} \left\| n_{b_j}^T \cdot (h_i(y) - b_j) \right\|^2 \quad (21)$$

where $t'\tau$ is the sub-sample factor (e.g., $t'=2\tau=2$ will choose every other hair guide for collision handling), and $S t' S_\tau$ is the selected subset of hairs corresponding to $t'\tau$. Note that an increase in the weight of the penetration term to counter balance the sub-sampling.

8. Experiments

Initially, generate three datasets with different numbers of hair guides $N_g$: a sparse hair dataset with $N_g=198$, a main hair dataset with $N_g=962$, and a dense hair dataset with $N_g=3980$. For the sparse hair dataset, synthesize four sets of hair simulations (long soft, long stiff, short soft, and short stiff) to learn a two factor model with hair softness and length as the constituent factors. The main hair dataset is separated into two parts. The first part has the same four styles as the sparse dataset. The second part consists of long soft hairstyle, long soft hairstyle with wind along +z, long soft hairstyle with wind along +x, and long soft hair style with wind along -x. Use these four simulation datasets to learn a multilinear model with external wind strength and directions as constituent factors. The dense hair dataset only has one style (long soft) because it is expensive to generate due to the memory constraints and computing resources. Use the dense hair dataset to demonstrate the sub-sampling strategy for collision handling. Each dataset consists of 35 different training body motions on which the multi-linear dynamic hair model is learned and 7 test body motions on which experiments are performed. The test and training sets are disjoint. A dimensionality of $d_h=100$ for hair coefficients is chosen, which represents around 98% energy of the PCA subspace. Set $\pi_1=0.08$, $\pi_3=1.5$ in Equation 20 for all the experiments.

8.1 Model Highlights

Figure 7:
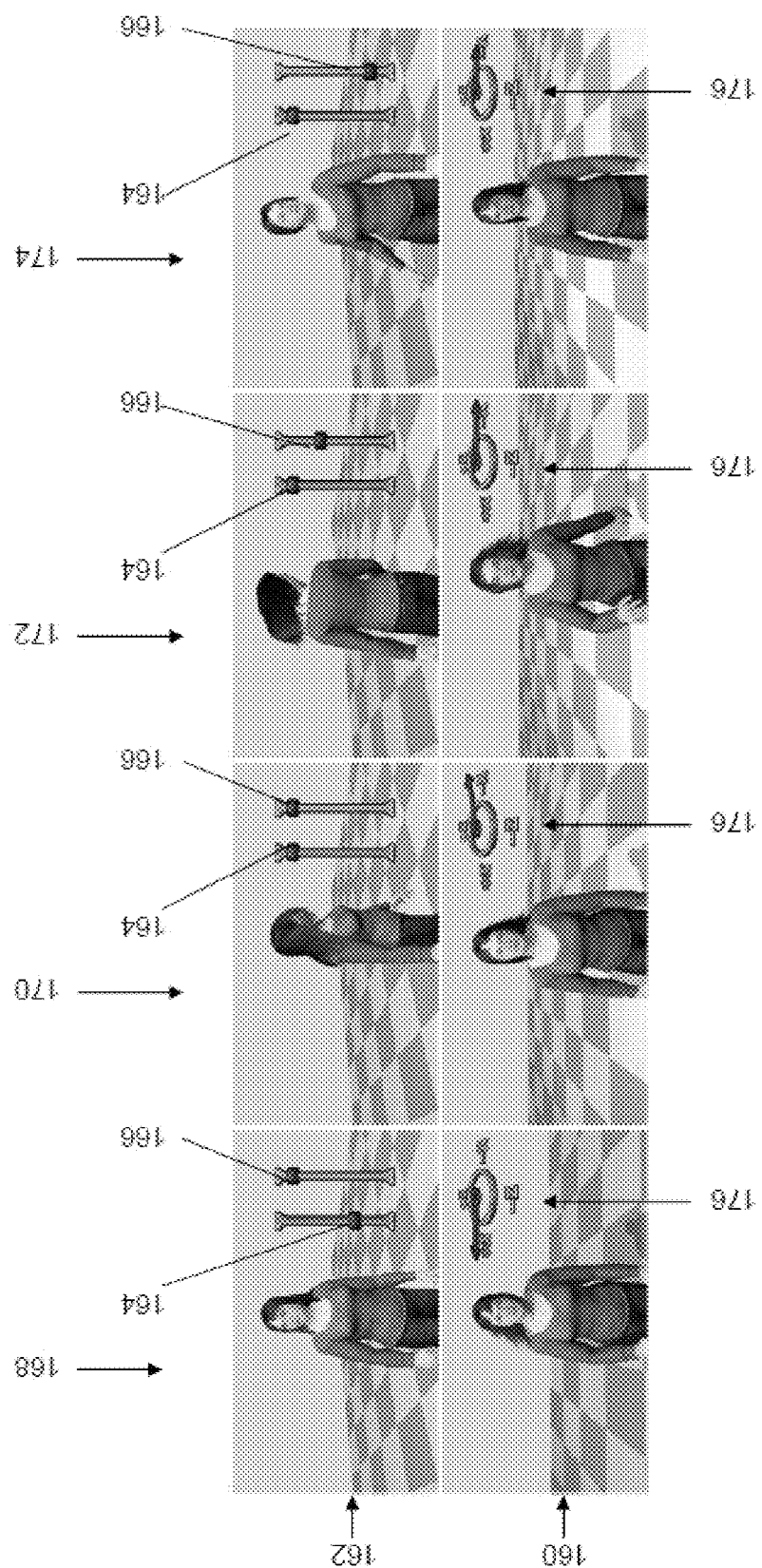
FIG. 7 illustrates a real-time animation of 900 guide multi-linear hair model, with interactive control over parameters including hair softness, length, and wind strength and direction.

A key property of the present model is that users are able to interactively change the style of hair, including softness and length, or apply external forces such as wind. FIG. 7 illustrates real-time animation of 900 guide multi-linear hair model with interactive levers that may be modified by a user to control such parameters. A bottom row 160 illustrates control of the direction and strength of wind, and a top row 162 illustrates the length and hair softness as interactively controlled by a user. In the top row, the hair softness may be controlled by a red slider bar 164, and the hair length may be controlled by a blue slider bar 166. Their positions relative to a scale determine the respective softness and length. In a first column 168, the hair softness is relatively low, and the hair length is relatively long. In a second column 170, both the hair softness and hair length are near maximums. In a third column 172, the hair softness is near a maximum, and the length is near mid-length. In a fourth column 174, the hair softness remains near maximum, and the length is near a minimum.

Turning to the bottom row 160, in the first column 168 the wind direction is strongly blowing to the left causing displacement of the hair to displace strongly to the left. Generally, the direction and magnitude of the wind may be controlled by the user moving a pointer (vector) about a compass 176 or other directionally significant tool. The length of the point may be controlled to adjust the magnitude of the wind. Typically, longer pointers indicate greater magnitude. In a second column 170, the wind is directed to the right and slightly to the back causing the hair to displace accordingly. In the third column 172, the wind is blowing strongly to the right, causing the hair to displace to the right. In the fourth column 174, the wind is blowing only slightly to the right, causing minor displacement of the hair to the right.

Figure 8:
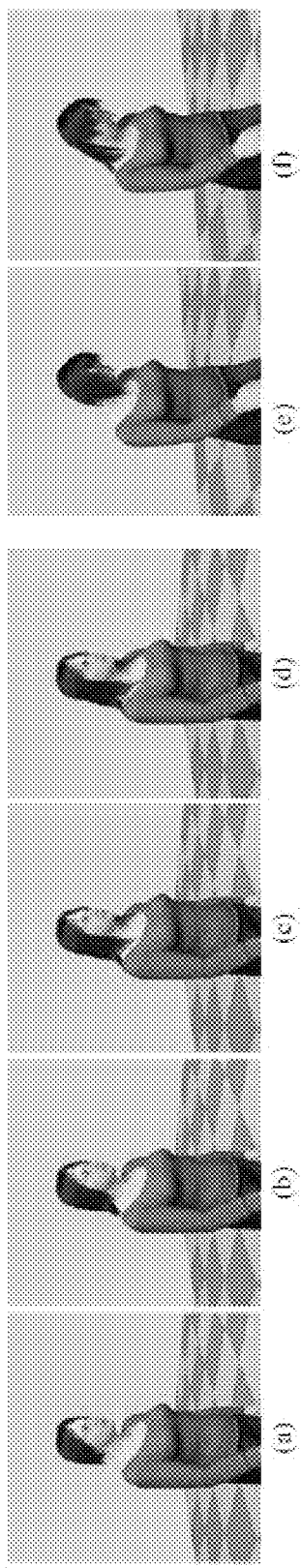
FIG. 8 illustrates the creation of different grooms: (a) short, (b) interpolated medium, (c) long, and (d) extrapolated long. Additionally, (e) and (f) illustrate new haircuts created by segmenting hair guides into segments and mixing long and short lengths (in (a) and (c)) for each segment.

A side-by-side comparison of different hair lengths is shown in FIG. 8 (a)-(d), where (a)-(c) show the interpolated hair lengths with hair length factor being 0 (shortest), 0.5 (interpolated median), and 1 (longest), while (d) shows an extrapolation example where the length factor is 1.35. As such, the model allows extrapolation of data points beyond the dataset employed. Specifically, a maximum length set forth in the dataset may be exceeded by up to 20-35% or more. Additional hair styles, not part of the training sets, may be generated by mixing the long and short hair styles modeled. FIG. 8 (e)-(f) show two examples. This functionality opens a possibility for interactive hairstyle design for avatars in games and other digital media that are not limited by or bounded by the limits of the datasets used to in the model.

8.2 Collision Handling

The performance of collision handling algorithms on the sparse hair dataset ($N_g=198$) is shown, but also find similar trends in all other datasets. The following measurements are defined for quantitative evaluation: (1) Penetration rate: the ratio of penetrating hair points to the total hair points. Penetration is defined by Equation 14. (2) The mean of maximal penetration amount over all frames in a sequence. The maximal penetration amount for each frame is defined as max $|n^T_{b_{i \cdot (h_i^{j'}}}-b_j)|$, where $h_i$ is a penetrating hair point (see Equation 14). "Penetration rate" is the most straightforward measurement, while the "maximal penetration amount" provides an upper-bound of how deep a hair point penetrates. These two quantities are informative but not necessarily perceptual. Arbitrarily, $\pi_2$ in Equation 20 may be decreased to achieve better collision handling. Therefore, the third measurement is used: (3) deviation from the hair coefficients prediction: $\|\tilde{\lambda}^T (y^*-y_0)\|/\|y_0\|$ where $y_0$ is the model prediction, $y^*$ are the hair coefficients after collision handling, and $\tilde{\lambda}=[\lambda_1, \lambda_2, \ldots, \lambda_{d_h}]^T/\Sigma_{i=1}^{d_h}\lambda_i$ are the normalized eigenvalues of the hair PCA subspace. The hair coefficients deviation $y^*-y_0$ is weighted according to the importance of the principal directions.

Figure 9:
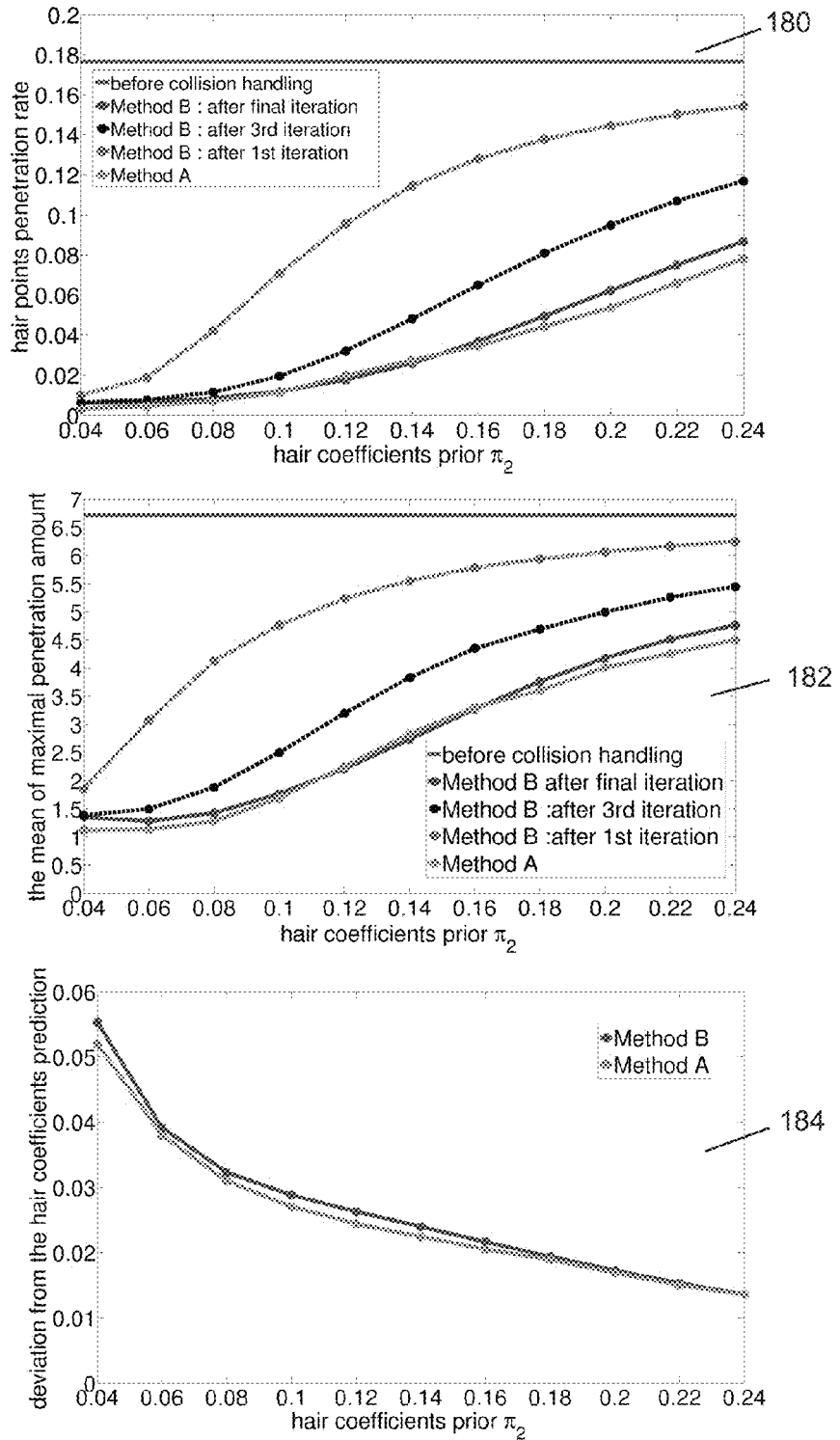
FIG. 9 illustrates collision handling measurements showing comparison results for a method A, two intermediate steps of method t3, final results of method t3, and before collision handling.

In FIG. 9, the above-mentioned three measures are shown versus different hair coefficients prior $\pi_2$. Specifically, FIG. 9 illustrates plots of collision handling measurements versus hair coefficients. A left plot 180 shows the hair penetration rate, a middle plot 182 shows the mean of maximal penetration amount, and a right plot 184 shows deviation from the hair coefficients prediction. The plots are based on a representative test sequence with long soft hairs which includes complex motions such as sudden accelerations, head turning, and random head postures. Before collision handling, the penetration rate is slightly below 18%, and the mean of maximal penetration amount is about 6.7. Note that the ground truth physically-based hair simulations in themselves have a non-negligent penetration rate of 1.9%, and the mean of maximal penetration amount of 3.8. The collision handling algorithms (both Method A and B) significantly reduce the penetration. Method B also gradually resolves penetration, as shown. The final penetration rates and amount of Method B are similar to A which indicates that the iterative least squares do approximate the asymmetric error function in A well. As can be see from FIG. 9 (right), the deviation from the original hair coefficients prediction varies between 1.3% and 5.5%, which visually corresponds to very natural dynamics. Deviation from hair coefficients in FIG. 9 (right) first drops quickly and then gradually becomes linear, which guides the selection of $\pi_2$ in practice. Based on these three curves, the selection of $\pi_2$ is 0.13 for all the experiments.

8.3 Sub-Sampling for Collision Handling

Figure 10:
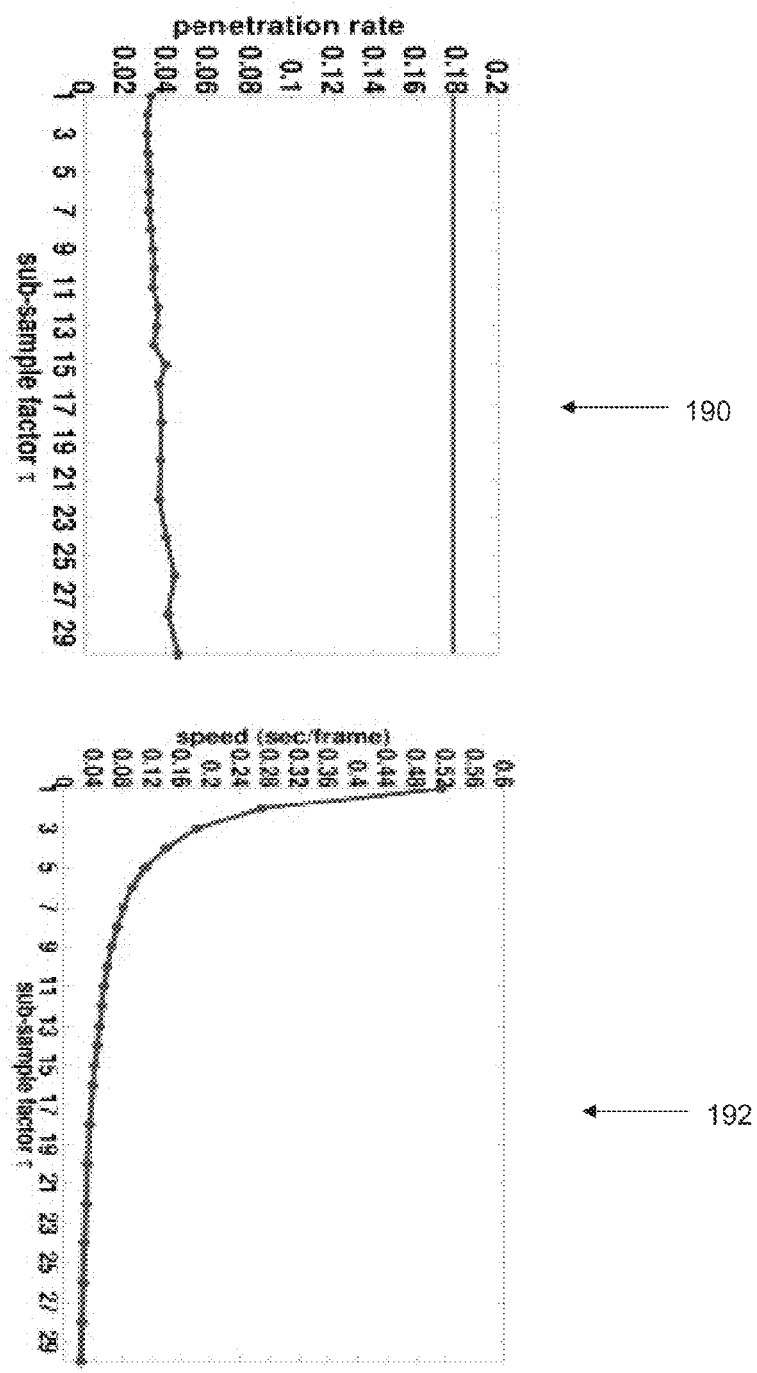
FIG. 10 illustrates dense hair sub-sampling. On the left, penetration rates comparisons between "before collision handling" (red) and various sub-sample factors on a representative sequence (blue). The penetration rates are computed on the full hairs. On the right, time cost of collision handling procedure is plotted versus various sub-sample factors.

FIG. 10 illustrates dense hair sub-sampling. A left plot 190 shows penetration rates comparisons between "before collision handling" (red) and various sub-sample factors on a representative sequence (blue). The penetration rates are computed on the full hairs. A plot on the right 192 shows time cost of collision handling procedure versus various sub-sample factors. When modeling dense hair dataset (3980 hair guides and 59700 hair points), the cost of Method B is dominated by determining which hair guide points are penetrating (i.e., computing the nearest neighbor correspondence). Therefore, FIG. 10 shows that efficient sub-sampling of the hair guides performs collision handling while still achieving almost the same results. With the increasing of sub-sample factor $r'$ (see Equation 21), the curve of the penetration rate is almost flat, which indicates that sub-sampling the hairs significantly without sacrificing the collision handling performance is possible, because the dense hair guides are highly correlated.

Figure 11:
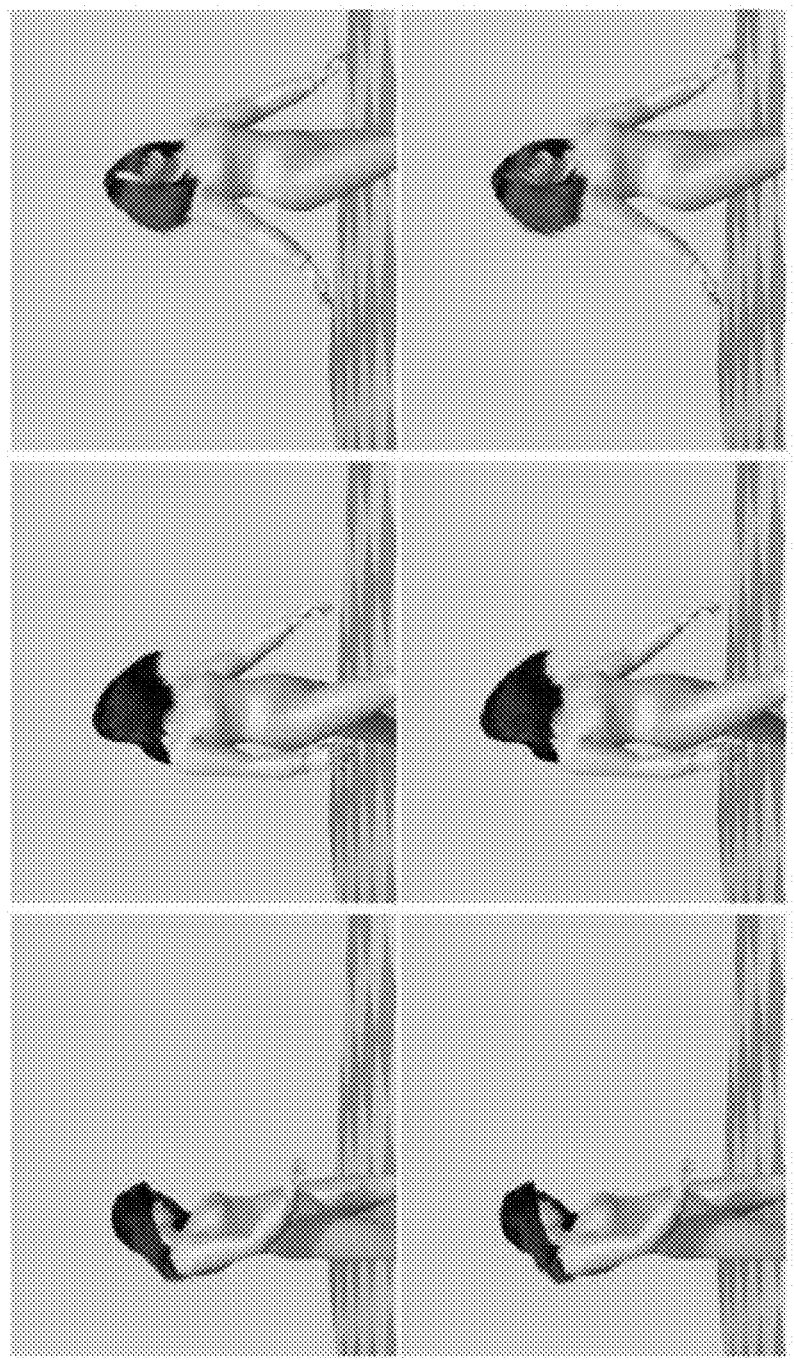
FIG. 11 illustrates sub-sampling factors. Specifically, sub-sampling factors of 1 and 15 are illustrated (top to bottom, respectively) on a 3,980 hair guide dataset.

FIG. 11 illustrates collision handling using sub-sampling factors of 1 and 15 from top to bottom respectively on the 3,980 hair guide dataset. Notice that there is almost no visual difference among the hairs corresponding to different sub-sampling factors. There is however a large computational gain. In particular, a 12× speed up is achieved by using a sub-sample factor of 15. The time cost of the collision handling procedure (from the predicted hair coefficients y0 to final hair coefficients y*) are plotted versus the sub-sample factor $r'$. As $r'$ increases, the time cost drops significantly. The sub-sampling strategy makes it possible for the method to potentially deal with even more hair strands in real time.

8.4. Quantitative Evaluation

The hair vertex location differences between the a conventional hair softwaresimulation and end results of the present method are shown in Table 1. Stiff hairs have much lower errors compared to soft hairs, because the motion of the stiff hairs is more constrained. The long soft hairs with wind have high errors, because wind leads to less predictable hair behavior. That training and testing sequences get similar errors (in some cases the errors of the testing sequences are lower) indicates the generalization power of the method. Furthermore, the stability measurement $\lambda_{max}$ for each dataset is also shown in the table. These values are all below 1, which proves that the present models are stable.

TABLE 1

Average vertex error and stability.

| Sparse | L-soft | L-stiff | S-soft | S-stiff | λmax |
|---|---|---|---|---|---|
| Training | 3.39 cm | 2.09 cm | 1.73 cm | 1.23 cm | 0.9792 |
| Testing | 3.61 cm | 1.93 cm | 1.91 cm | 1.14 cm | |
| Main | L-soft | L-stiff | S-soft | S-stiff | |
| Training | 2.85 cm | 1.66 cm | 1.20 cm | 0.84 cm | 0.9646 |
| Testing | 2.93 cm | 1.57 cm | 1.22 cm | 0.78 cm | |
| Main | L-soft | L-wind + z | L-wind + x | L-wind − x | |
| Training | 2.97 cm | 4.23 cm | 4.50 cm | 4.32 cm | 0.9663 |
| Testing | 3.12 cm | 4.27 cm | 4.47 cm | 4.21 cm | |
| Dense | L-soft | | | | |
| Training | 2.76 cm | | | | 0.9621 |
| Testing | 2.71 cm | | | | |

The average vertex error for all the datasets using Euclidean distance measured in cm on 35 training sequences as well as on 7 testing sequences is reported in Table 1. The regular hair dataset has two parts: (1) four styles of hairs (2) hairs without wind and hairs with three different wind directions. "L" and "S" represent long and short hairs respectively.

8.5. Runtime Performance

The speed of the method and the conventional simulation package used to create the test set are shown in Table 2. In this example, the conventional simulation was run on an Intel Core 2 Extreme X9650, 3.67 GHz processors with 4 GB of RAM. The present model was run on a comparable AMD Phenom™ 2 X4 965 processor, 3.4 GHz with 8 GB of RAM. The additional RAM in the case of the present model is irrelevant as it is very compact and easily fits in memory. Despite the fact that a large part of the present model (synthesis and collision handling) is implemented in Matlab, it still runs in real time and is 5-14 times faster than the conventional simulation software program tested. Note that the PCA reconstruction was implemented on a GPU. Additionally, it is worth noting that the collision handling cost is generally higher for long hairstyles because long hairs typically have many more collisions. The results based on long soft hairs are discussed below.

Generally, as the number of hair guides increases, the present method becomes comparatively much more efficient, due to the benefit of a low-dimensional model that can capture correlations. This results from the potential of the present method to deal with large number of hair guides. In doing so, it also alleviates the need for additional hair interpolation for rendering. In an alternative aspect, a GPU implementation may be provided that is expected to be significantly faster.

TABLE 2

Runtime performance. Speed comparison (milliseconds per frame) between the present method and conventional simulation software package. The present method is divided into "Synthesis" (computing the initial hair coefficients from the multi-linear dynamic model), "Collision" (remove hair points penetration), and "Recon" (reconstruction of the hair vertices from hair coefficients). The choices of sub-sample factor $r^1$ for different hair datasets are also shown in Table 2.

| Hair | | Runtime (milliseconds/frame) The Present Method | | | | Conventional |
|---|---|---|---|---|---|---|
| #Strands | #Vert | Synthesis | Collision | Recon | Total | Program |
| 198 | 2970 | 0.7 | 25.3 ($r^1$ = 1) | 0.2 | 26.2 | 130 |
| 962 | 14430 | 0.7 | 26 ($r^1$ = 4) | 0.4 | 27.1 | 180 |
| 3980 | 59700 | 0.7 | 36.8 ($r^1$ = 15) | 1.1 | 38.6 | 550 |

Collision Handling for Cloth

Figure 12:
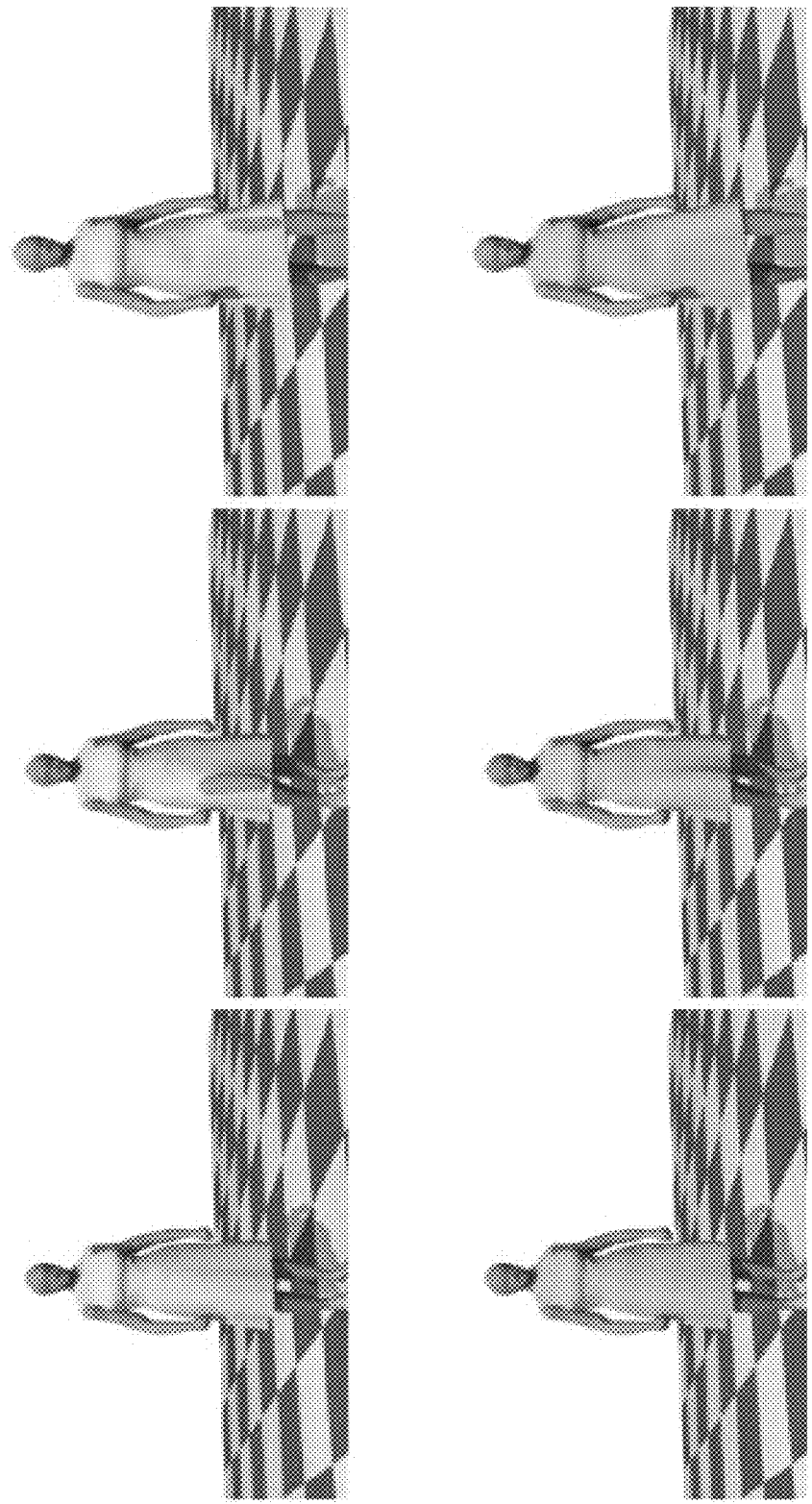
FIG. 12 illustrates collision handling for cloth of the present method.

The collision handling approach proposed is not limited to hair, but can also be used to model other dynamic simulations, for example, to resolve body-cloth collisions for clothing. In prior approaches, the collisions were not resolved explicitly. This is shown in the top row of FIG. 12. Instead, the prior approach relied on a custom rendering pipeline that resolved collisions at render time. Such a custom pipeline is difficult to enforce in practice, particularly in cases where the character is close to other geometry in the scene. It is also unable to deal with deeper penetrations that may occur. The collision handling of the present approach was applied on the same dataset, and the results are shown in the bottom row in FIG. 12. As shown, the present approach effectively and efficiently resolved all the interpenetrations without resorting to a custom rendering pipeline. The dataset was obtained from "Stable Spaces for Real-time Clothing".

DISCUSSION

The present method is for data-driven animation of hair or clothing. The multi-linear nature of present model allowed control of the appearance and motion of hair in real-time. The method efficiently deals with collisions by formulating collision handling as an iterative least squares optimization in the reduced space. While the model is discussed with specific reference to hair, the formulation is general and would work for other physical simulations such as clothing and fur.

One of the issues encountered when building the models is that the results from off-the-shelf hair simulation packages are not free of collision. In particular, they often contain visible penetrations of the hair into the shoulders for longer hair or the scalp for highly dynamic motions. The software package used has a fixed number of control vertices per hair guide. This constraint works well for short hair where the control vertices are tightly spaced, but results in collisions for longer hairstyles where interactions with the neck, shoulders, and back are more complex. This limitation prevented modeling very long hair as training data was lacking where the penetrations did not fundamentally change the motion. Also, presumably the model would produce hair motion for novel body motions with fewer collisions if the training data was collision free.

Two types of reduced models with a number of parameters are presented: short versus long, stiff versus soft, and with wind as an external force. Naturally there are many other parameters that may be included in the hair model, such as: curly versus straight, dry versus wet, greasy versus clean, as well as other external forces such as tugs, barrettes, and headbands. In experiments, the existing model was robust to the modeled parameter space, with no combination of parameters within the modeled ranges producing unnatural results. However, if the number of modeled parameters is increased, it may be discovered that the convex hull of those parameter values did in fact contain points in the space that produced unnatural motion. For large sets of parameters the training may also include more sophisticated out of core algorithms as it may be challenging to keep all the training data in memory.

In conclusion, the approach to creating a reduced space model presented here appears quite powerful. Implementing this approach for other physical simulations such as clothing and fur would be relatively easy and would result in approximate dynamic models that could be computed and rendered many times faster than real time. This functionality would be useful in visualization of character motion during the animation process as well as allowing rich secondary motion to be added to real-time applications such as video games.

Although the foregoing discussion has presented specific aspects, persons skilled in the art will recognize that changes may be made in form and detail without departing from the spirit and scope of the aspects. Accordingly, the specific aspects described herein should be understood as examples and not limiting the scope thereof.

The invention claimed is:

1. A method of motion modeling for hair, fur, or clothing comprising:
representing flexible elements as a plurality of points;
reducing a dimensionality of the flexible elements to achieve a reduced sub-space;
generating a data tensor of multiple factors representing a composite effect of the factors on the flexible elements, which models the flexible elements in the reduced sub-space;
decomposing the data tensor to create a mode matrix for each of the multiple factors in a multi-factor flexible element framework, wherein each mode matrix spans a space defined by a plurality of dataset entries for one of the multiple factors;
interpolating between the plurality of dataset entries in each mode matrix to create a continuum of models; and
outputting a visual representation of hair, fur, or clothing to a display based on the continuum of models.

2. The method of claim 1, wherein
the flexible elements correspond to hair with a plurality of hair strands, each of the plurality of hair stands including an attachment point to a scalp; and
the plurality of points represent a plurality of hair points along each strand of the plurality of hair strands.

3. The method of claim 1, wherein
the flexible elements correspond to fur with a plurality of follicle strands, each of the plurality of follicle strands including an attachment point to a body; and
the plurality of points represent a plurality of follicle points along each strand of the plurality of follicle strands.

4. The method of claim 1, wherein
the flexible elements correspond to cloth; and
the plurality of points represent a plurality of vertices forming a mesh representing the cloth.

5. The method of claim 1, further comprising a collision handling routine comprising minimizing an energy function, where each term in the energy function is approximated using a quadratic form.

6. The method of claim 5 further comprising iteratively solving optimizations, using least-squares optimization, and recomputing the energy function.

7. The method of claim 6, wherein iteratively solving optimizations and recomputing the energy function uses at least one approximated term for each set of penetrating points.

8. The method of claim 7, wherein five or fewer iterations are performed.

9. The method of claim 1 further comprising:
sub-sampling guides of the flexible elements; and
perform collision handling on the sub-sampled flexible element guides.

10. The method of claim 1, wherein the multiple factors comprise at least one of:
a softness, a length, a style, a weight, a groom, a wind strength, a wind direction, an air moisture, one or more products within the flexible elements, an ability of the flexible elements to maintain shape, a head pose, or a head motion.

11. The method of claim 10, wherein the multiple factors are modeled using a non-linear factor model.

12. The method of claim 1, further comprising modeling the flexible elements in a canonical space.

13. The method of claim 1, further comprising receiving a user input adjusting at least one of the multiple factors.

14. The method of claim 1, further comprising modeling a motion of the flexible elements based on external forces, wherein a wind magnitude and direction are set by a user.

15. The method of claim 1, further comprising modeling a body and scalp to which the flexible elements are attached, wherein the body is modeled as a set of vertices of a triangular mesh.

16. The method of claim 15, wherein a dimensionality of the body is reduced to a low-dimensional sub-space.

17. The method of claim 1, wherein reducing of the dimensionality for the flexible elements is done using Principal Component Analysis applied to training simulations.

18. The method of claim 17, where the data tensor is obtained from training simulations.

19. The method of claim 1, further comprising simulating flexible element dynamics by using a generative model that infers the behavior of the flexible elements from a short temporal window.

20. The method of claim 19, where the short temporal window is of the second order corresponding to a second-order dynamics.

21. The method of claim 1, wherein the continuum of models comprises a core tensor and a mode matrix for each of the multiple factors.

22. The method of claim 21, wherein each of the multiple factors has a plurality of possible values and each of the mode matrices takes into account each of the possible values of one of the multiple factors.

23. The method of claim 1, further comprising:
receiving one or more values for each of the multiple factors;
determining one or more flexible elements coefficients based on the one or more values.

24. The method of claim 1, wherein the data tensor of multiple factors has at least three dimensions.

25. A method for modeling hair motion on a computer comprising:
representing the hair with hair strands, each hair strand comprising of an attachment point to a scalp and a plurality of hair points;
generating a data tensor of multiple factors representing a composite effect of the factors on the flexible elements which models hair strands;
decomposing and reducing the data tensor to create a lower dimensional tensor representation to create a plurality of mode matrices having a plurality of dataset entries characterizing the multiple factors in a multi-factor hair framework;
interpolating between the plurality of dataset entries in each mode matrix to create a continuum of models; and
generating a visual representation of hair, fur, or clothing for display based on the continuum of models.

26. The method of claim 25, further comprising a collision handling routine comprising minimizing an energy function.

27. The method of claim 25, further comprising modeling the hair in a canonical space.

28. The method of claim 25, further comprising receiving user input adjusting at least one of the multiple factors.

29. The method of claim 25, further comprising modeling hair motion based on external forces, wherein a wind magnitude and direction are set by a user, and wherein the hair strands are at least one of human hair, animal fur, or cloth strands.

30. The method of claim 25, further comprising modeling a body and scalp to which the hair guides are attached, wherein the body is modeled as a set of vertices of a triangular mesh.

31. The method of claim 30, wherein a dimensionality of the body is reduced to a low-dimensional sub-space.

32. A method for modeling motion of flexible elements, such as hair, fur, or cloth, on a computer comprising:
representing a plurality of flexible elements in terms of a plurality of points, each of the flexible elements comprising an attachment point to a base and a plurality of points;
generating a data tensor of multiple factors representing a composite effect of the factors on the flexible elements which models the plurality of flexible elements;
decomposing and reducing the tensor to create a lower dimensional tensor representation to create a plurality of mode matrices having a plurality of data set entries characterizing the multiple factors in a multi-factor element framework;
interpolating between the plurality of dataset entries in each mode matrix to create a continuum of models; and
outputting a visual representation of hair, fur, or clothing to a display based on the continuum of models.

* * * * *